March 9, 1926.
J. W. AYMAR, JR
WASHER PLACING APPARATUS
Filed June 10, 1924
1,576,297
4 Sheets-Sheet 1
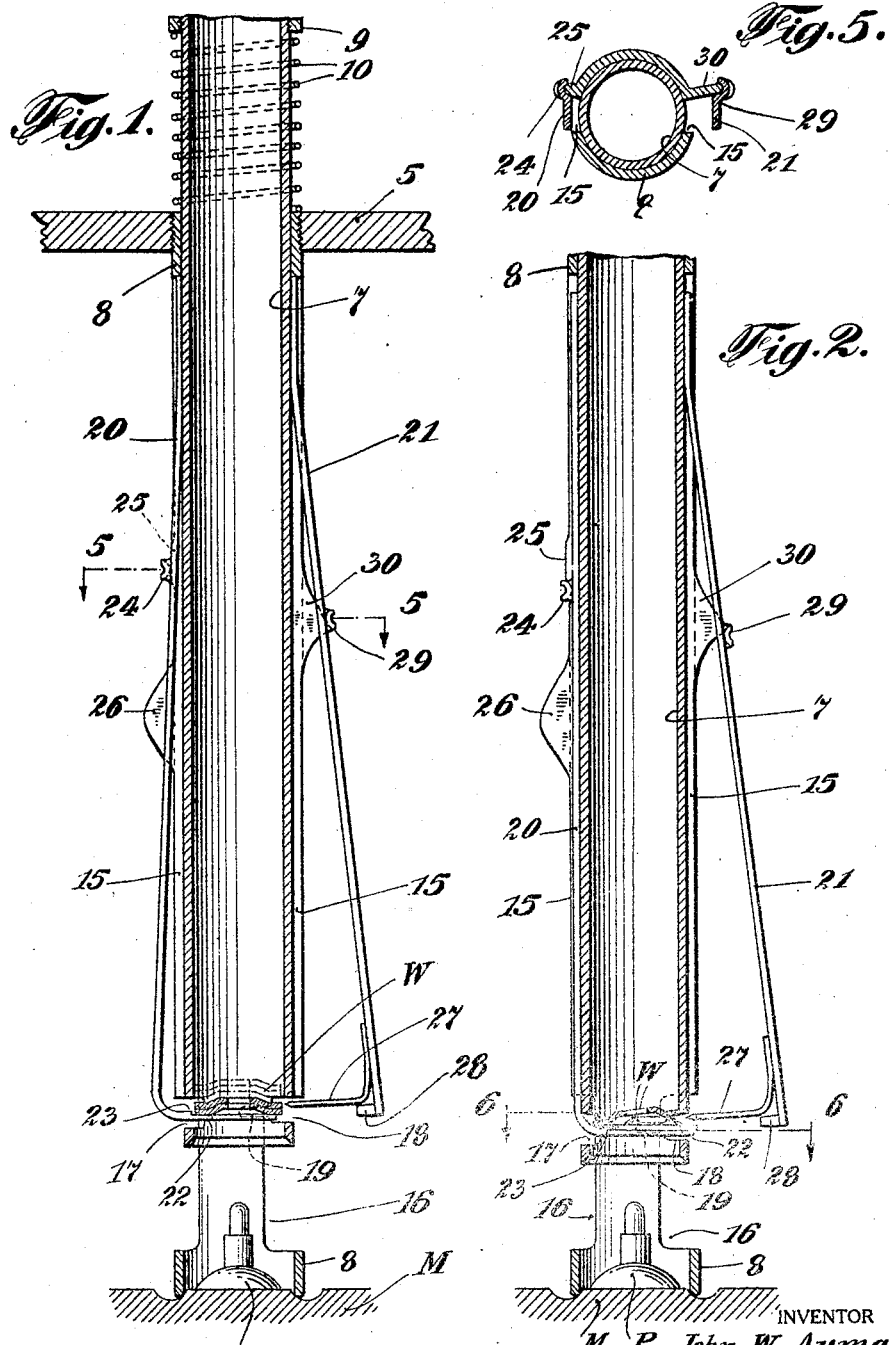
INVENTOR
John W. Aymar, Jr.
BY C. v. Goepel
his ATTORNEY March 9, 1926. 1,576,297
J. W. AYMAR, JR
WASHER PLACING APPARATUS
Filed June 10, 1924 4 Sheets-Sheet 2
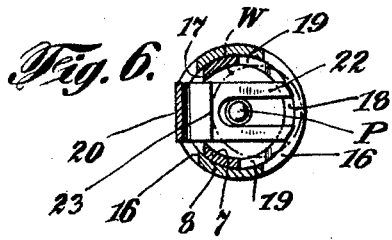
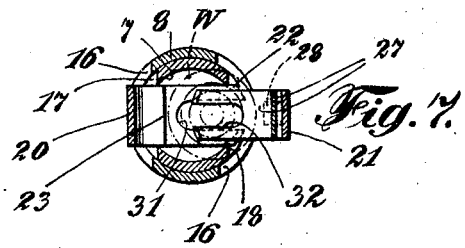
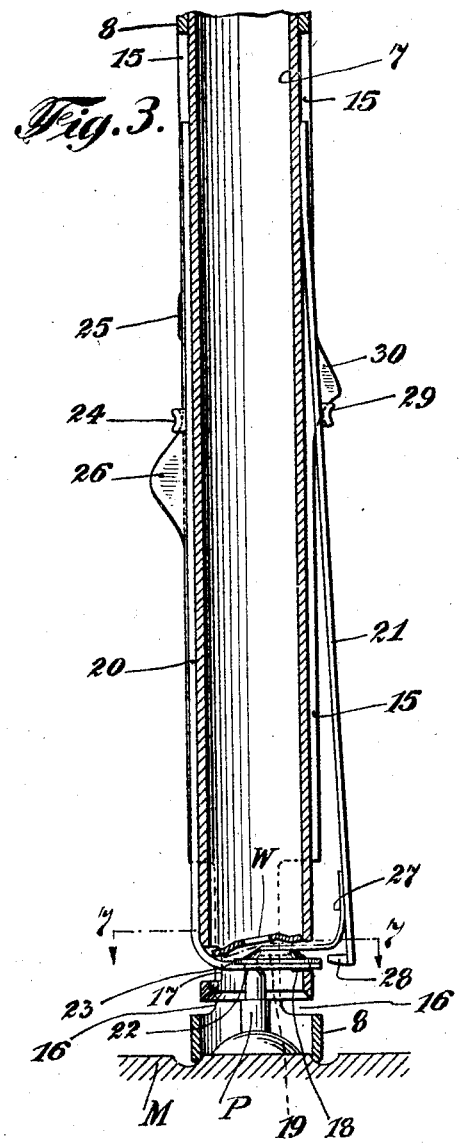
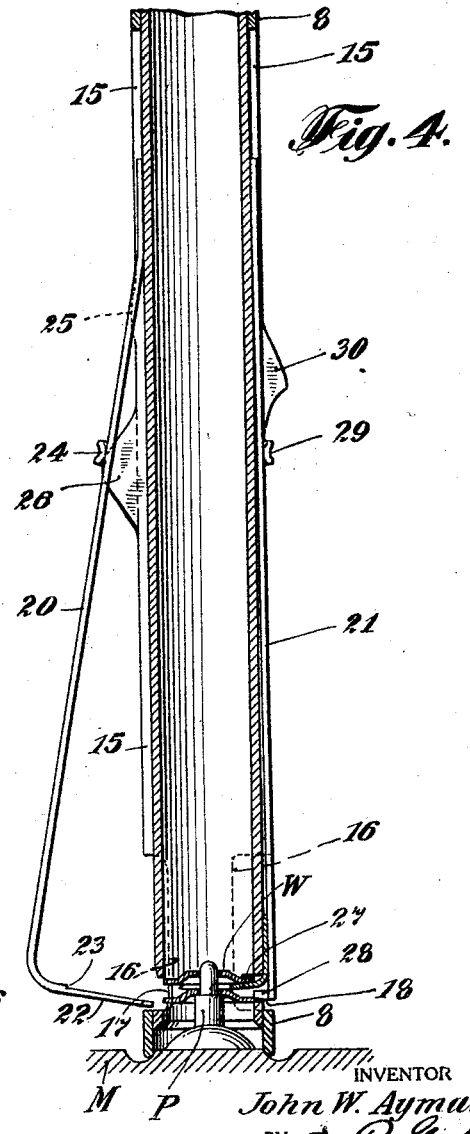
INVENTOR
John W. Aymar, Jr.
BY C. P. Goepel
his ATTORNEY March 9, 1926.
J. W. AYMAR, JR
1,576,297
WASHER PLACING APPARATUS
Filed June 10, 1924 4 Sheets-Sheet 3
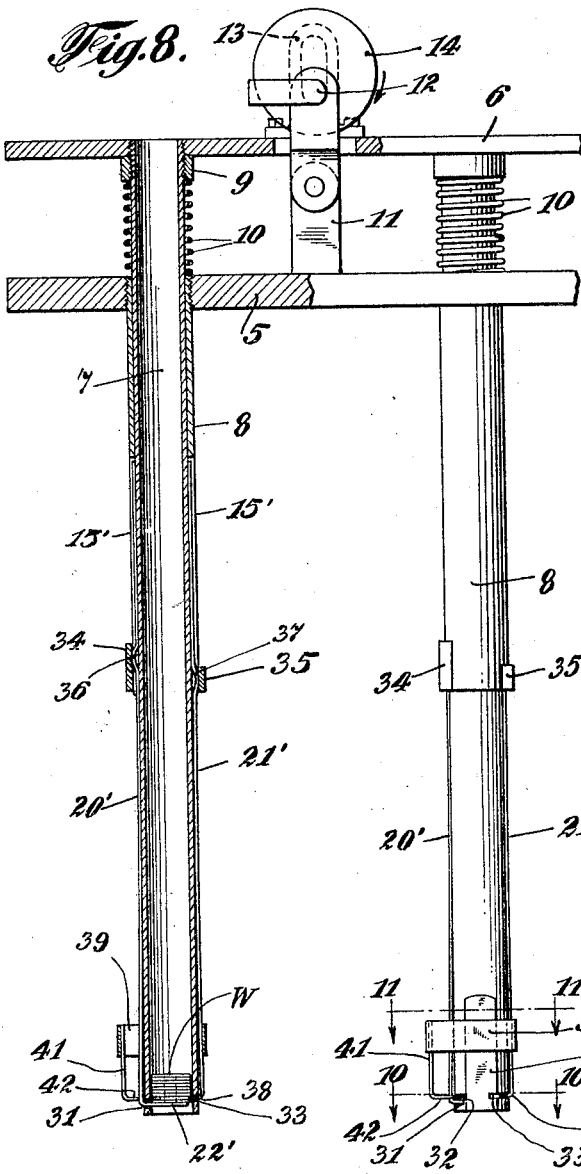
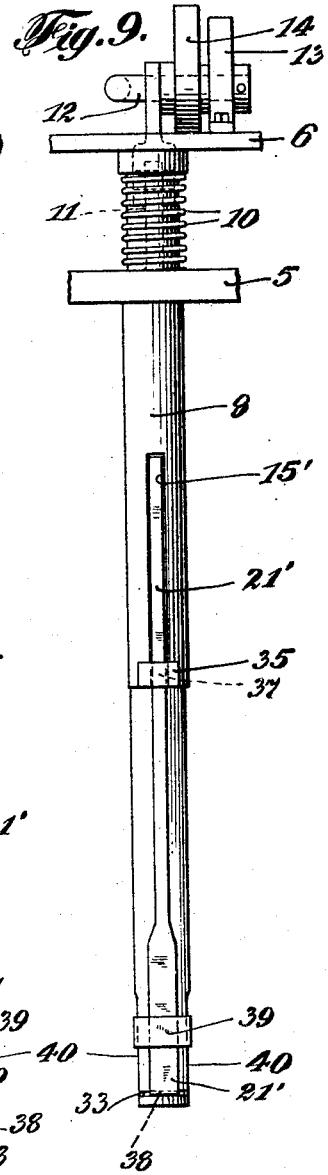
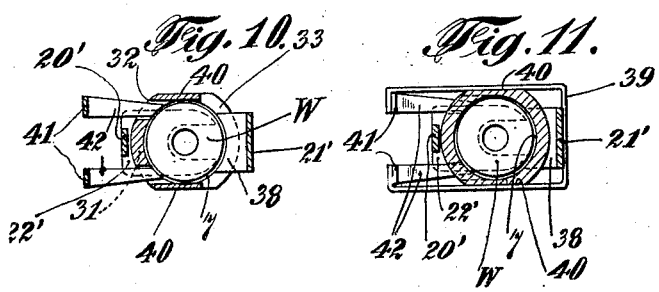
INVENTOR
John W. Aymar, Jr.
BY C. P. Goepel
his ATTORNEY March 9, 1926.

J. W. AYMAR, JR

WASHER PLACING APPARATUS

Filed June 10, 1924

INVENTOR
John W. Aymar, Jr.
BY
his ATTORNEY

Patented Mar. 9, 1926.

1,576,297

UNITED STATES PATENT OFFICE.

JOHN W. AYMAR, JR., OF MONTCLAIR, NEW JERSEY.

WASHER-PLACING APPARATUS.

Application filed June 10, 1924. Serial No. 719,033.

*To all whom it may concern:*

Be it known that I, JOHN W. AYMAR, Jr., a citizen of the United States, and a resident of Montclair, county of Essex, and State of New Jersey, have invented certain new and useful Improvements in Washer-Placing Apparatus, of which the following is a specification.

This invention relates to washer placing apparatus and is primarily designed for the purpose of expeditiously applying the nail holding washers to the supporting pins in the cavities of molds used in the molding of rubber heels for shoes. It will, however, become apparent as this description proceeds, that the invention is applicable to use in many other analogous cases wherein metal blanks or washer plates may be employed.

In its more generic aspect, the present disclosure contemplates the provision of a plurality of washer placing units, each having a washer receiving magazine, said units being adapted for arrangement each in washer placing relation with one of the pins of the mold cavity, and means for simultaneously releasing or discharging a single washer from each magazine and positioning the same upon the supporting pin.

It is also one of the important objects of my invention to provide an apparatus of this kind wherein conical washers may be closely stacked in superposed relation in the magazine and to provide simple and effective means for insuring the discharge in each operation of the device of only the lowermost washer in the stack or pile and during such discharging action, providing an adequate support for the stack of washers whereby the possibility of the same assuming an angular position and becoming wedged against the walls of the magazine, will be precluded.

It is also a general object of my invention to provide a washer placing apparatus of relatively large capacity so that re-charging will be required only at infrequent intervals and in which the several co-operating parts of the washer releasing or discharging means are of very simple and durable construction so that the apparatus is not liable to get out of order and the initial cost of manufacture will also be comparatively low.

With the above and other objects in view, the invention consists in the improved washer placing apparatus and in the form, construction and relative arrangement of the several parts as will be hereinafter more fully described, illustrated in the accompanying drawings and subsequently incorporated in the subjoined claims.

In the drawings wherein I have illustrated several simple and practical embodiments of the invention and in which similar reference characters designate corresponding parts throughout the several views:

Figure 1 is a vertical sectional view through one of the washer placing units particularly designed for use in connection with a well known form of conical washer and showing the parts in their normal relative positions;

Figure 2 is a similar view showing the relative positions of the parts at an intermediate stage in the operation of the device;

Figure 3 is a vertical sectional view of the washer placing device at a subsequent period of its operation;

Figure 4 is a like view showing the relative positions of the parts at the final operating period of the device;

Figure 5 is a horizontal sectional view taken on the line 5—5 of Figure 1;

Figure 6 is a similar view taken on the line 6—6 of Figure 2;

Figure 7 is a horizontal sectional view taken on the line 7—7 of Figure 3;

Figure 8 illustrates another embodiment of the invention designed for use in connection with flat washers and illustrating a convenient operating means for the washer placing units;

Figure 9 is a detail elevation of one of the washer placing units looking at right angles to Figure 8;

Figure 10 is a detail horizontal section taken on the line 10—10 of Figure 8;

Figure 11 is a similar section taken on the line 11—11 of Figure 8;

Figure 12:
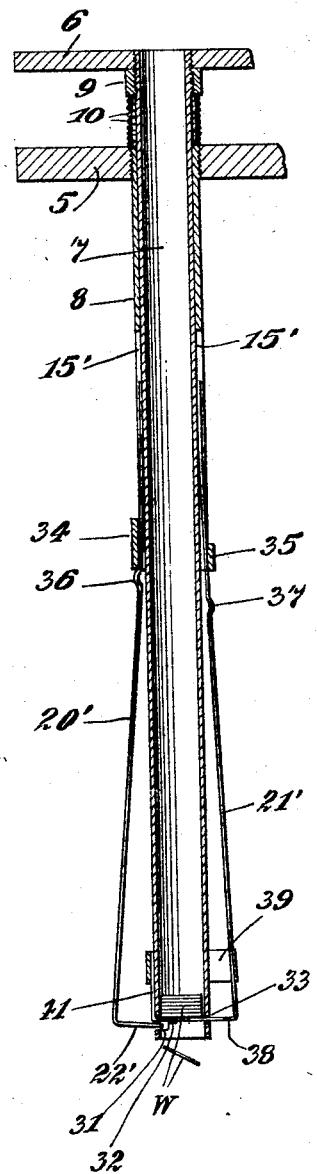
Figure 12 is a vertical section of one of the washer placing units showing the relative positions of the parts in the release or discharge of a washer.

In the manufacture of rubber heels for shoes, there is incorporated within the body of the stock in the molding operation, a series of nail holding washers. The number and arrangement of these washers varies in accordance with the size of the heel. Usually, a large number of such rubber heels are molded in each operation, and, therefore, one part of the mold is provided with a plurality of spaced mold cavities, each of said cavities having a plurality of spaced upstanding washer supporting pins. It is the common practice to arrange the nail holding washers upon these pins by hand. Not only is the placing of these washers in proper position a laborious and time-consuming operation, but careless workmen frequently drop the washers upon the mold face and neglect to remove them before placing the rubber stock into the cavity. Therefore, these misplaced washers are frequently embedded in the face of the heel after it is removed from the mold and also tend to mar the mold. It is my purpose to provide a simply constructed apparatus which will wholly obviate this misplacement of the washers and which may be embodied in one or more similar units so as to simultaneously apply the washers accurately in position upon the supporting pins of one or more cavities in the mold plate.

Both flat nail holding washers and those of conical or slightly concavo-convex form are commonly used, and I have illustrated in the drawings several embodiments of my invention for use in the placing of washers of these different types. The washers have a central hole or perforation which receives the upper reduced end of a pin P on the mold plate M, as shown for instance in Figure 6 of the drawings.

The form of washer most generally used in rubber shoe heels is referred to as the conical type and is provided with an offset or raised inner body portion of frustroconical form and an annular marginal flange which surrounds said body portion. I shall, therefore, first describe in detail the construction illustrated in Figures 1 to 7 of the drawings, which is particularly designed for applying a washer of this type to the supporting pins of the mold plate.

In practice, I prefer to arrange a plurality of washer placing units for simultaneous operation whereby the washers may be simultaneously placed upon the supporting pins of one or more heel forming cavities of the mold plate. Therefore, the units may be arranged in groups with the number of units in each group corresponding with the number of pins of each mold cavity. Any desired means might be provided for the operation of the washer placing units, and as a convenient illustration thereof, in Figure 8 of the drawings I have shown a horizontally positioned plate 5 which may be fixedly supported in any convenient manner above and in parallel relation to the mold plate. Above and in parallel relation to the plate 5, a second movable plate 6 is arranged. Each of the washer placing units includes a tubular magazine 7 open at its upper and lower ends. A sleeve 8 loosely surrounds this magazine and has its upper end threaded in an opening in the plate 5. The magazine 7 extends above the plate 5 and has its upper end threaded in an opening in the plate 6 and may be conveniently locked in position by a suitable nut 9 threaded upon the magazine and engaging the underside of said plate. Between this nut and the plate 5, a coil spring 10 surrounding the wall of the magazine is interposed and yieldingly urges the plate 6 upwardly. For the purpose of moving this yieldingly supported plate and forcing the washer magazine downwardly through the sleeve 8, I provide a standard 11 on the plate 5 projecting upwardly through an opening in the plate 6 and having a shaft 12 journaled in its upper end, one end of said shaft being positioned in a vertically disposed guide 13 fixed to the plate 6, while the other end of said shaft is provided with a suitable operating handle. Upon the shaft 12 an eccentric 14 of suitable form is secured and frictionally bears upon the surface of the plate 6. It will, therefore, be understood that when the eccentric 12 is rotated in the direction indicated by the arrow in Fig. 8, the plate 6 together with the several magazines 7 connected thereto is moved downwardly so that said magazines are projected longitudinally through the sleeves 8 of the fixed plate 5. Each of the washer placing units includes means for insuring the discharge of a single washer from the magazine 7 and the proper positioning of the same upon one of the mold pins P. This automatic single washer discharging means may vary somewhat as to form and arrangement of the co-operating elements depending upon the particular kind or type of washer which is used.

Referring first to Figures 1 to 7 of the drawings, which illustrate an embodiment of my present improvements adapted for applying washers of the well known conical type to the heel mold pins, the outer relatively fixed sleeve 8 of each washer unit is provided at diametrically opposite sides thereof with longitudinally extending slots 15. This sleeve extends below the lower open end of the magazine 7 and adjacent to its lower extremity is provided in opposite sides thereof with longitudinally extending rectangular openings 16 with which the respective slots 15 communicate. In this preferred construction the lower end of the sleeve 15 surrounds the heel mold pin P in concentric relation thereto and is in contact with the face of the mold cavity.

As shown in Figure 1 of the drawings, in the normal position of the magazine 7, it extends slightly below the lower ends of the slots 15 in the sleeve 8, the wall of said magazine below the slots 15 having openings 17 and 18 in diametrically opposite sides thereof and the opening 18 having a relatively wide central portion and comparatively narrow circumferentially extending end portions 19, the said opening extending through substantially 180° around the magazine wall. The particular purpose of this construction will presently appear.

To the outer side of the wall of the magazine 7, the upper ends of the longitudinally extending spring members 20 and 21 extending within the respective slots 15 of the sleeve 8, are suitably secured. The lower end of the member 20 is horizontally extended as at 22 inwardly through the slot 17 in the magazine wall and normally supports the stack of washers W contained the magazine. These washers of the form hereinbefore referred to nest in closely superimposed contacting relation so that there is no space between the marginal flanges of the adjacent washers. The horizontal extension 22 of the member 20 is provided at its upper side and at the inner end thereof with a shoulder 23 the depth of which is slightly less than the thickness of a single washer. Upon one edge of the member 20 intermediate of its ends a lug 24 is formed which is adapted to coact with spaced cams 25 and 26 respectively formed upon the wall of the sleeve 8 at the edge of one of the slots 15 therein, said cams being spaced from each other longitudinally of said slot.

The other spring member 21 has an angular resilient finger 27 fixed to the inner side thereof adjacent its lower free end, one arm of said finger extending longitudinally of the member 21 and being suitably secured at its extremity thereto and extending from such fixed extremity normally in divergent relation from the inner face of said member. The other arm of the finger 27 extends inwardly and is adapted to operate through the slot 18 in the magazine wall. Immediately below this finger 27 a lug 28 is provided upon the inner face of the member 21 the purpose of which will be hereinafter explained.

The member 21 is also provided intermediate of its ends and upon one edge thereof with a lug 29 which is adapted to co-operate with a single cam projection 30 formed on the wall of the fixed sleeve 8 at one edge of the other slot 15 therein. Each of the members 20 and 21, owing to its inherent resiliency, normally tends to occupy a position within one of the slots 15 of the sleeve 8 in substantially parallel relation with said sleeve and the wall of the magazine 7. The horizontal arm 22 on the lower end of the member 20 is provided with an open ended slot 31 to accommodate the mold pin and the inwardly extending arm of the resilient finger 27 also has a slot 32 therein for a similar purpose, as clearly shown in Figure 7 of the drawings.

With the foregoing description in mind, upon a comparison of Figures 1, 2, 3 and 4 of the drawings, the operation of this embodiment of my invention will be readily understood. Thus, as shown in Figure 1, it is seen that under normal conditions the arm 22 of the spring member 20 is disposed in position through the slot 17 of the magazine wall and supports the stack of washers arranged in parallel superposed relation to each other in a concentric position relative to the magazine wall. It will be noted that the lug 24 of said spring member is, in this normal position, engaged upon the high part of the upper cam projection 25 on the wall of the sleeve 8, while the lug 29 of the other spring member 21 is engaged upon the high part of the cam projection 30 on said sleeve wall. Thus it is seen that this spring member is held in an outward distended position so that the resilient finger 27 on the lower end thereof does not project within the magazine.

Upon the initial downward movement of the magazine 7 through the sleeve 8 the lug 24 of spring member 20 moves off of the high part of cam 25 so that said spring member assumes a position within one of the slots 15 of the sleeve 8 and in substantially parallel relation with the wall of the magazine. In this movement to such a position, the shoulder 23 on the lower horizontal arm 22 of said member engages the edge of the lowermost washer W and shifts the same laterally so that a portion of the annular marginal flange of said washer is projected through the slot 18 and the circumferential end extensions 19. In this lateral shifting of the lowermost washer, owing to the conical form of the central portions of the washer plates, the other washers in the stack will be lifted and the next adjacent washer to said shifted washer will assume an angular position substantially as shown in Figure 2 so that its marginal edge at the slot 18 in the magazine wall will be spaced from the marginal edge of said lowermost washer. This position of the parts is clearly shown in Figure 2 and it will be observed that the lug 29 of the member 21 still remains engaged upon the high part of cam 30.

In the continued downward movement of the magazine 7, the lug 24 on member 20 rides upon the surface of sleeve 8 and said member is retained substantially in the same position as shown in Figure 2 of the drawings. Simultaneously, the lug 29 of member 21 rides upon the lower inwardly curved portion of cam 30 so that the lower end of said member moves inwardly, thus projecting the resilient finger 27 through the slot 18 and between the lowermost washer and the next adjacent washer. As said finger rides over the conical portion of the lowermost washer, it is tensioned and deflected upwardly against the next adjacent washer. This relative position of the parts is seen in Figure 3 of the drawings, from which it will further be noted that in the downward movement of the magazine, the lowermost washer has now reached a position closely adjacent to the upper end of the mold pin.

In the final operation the lug 24 on the spring member 20 rides upon the high portion of the cam 26 so that the horizontal arm 21 of said member is moved outwardly through the slot 17 and disengaged from the lowermost washer. Simultaneously, the lug 29 of member 21 moves off of the cam 30 so that this member moves into the slot 15 of sleeve 8 in substantially parallel relation to the magazine wall and during such movement the resilient finger 27 is further projected through the slot 18 between the adjacent washers. At the same time, the lug 28 on the lower end of the member 21, engages the edge of the lower washer projecting through slot 18 and returns the same to a position in concentric relation with the mold pin P. Thus as the magazine reaches the limit of its downward stroke, the upper reduced end of the mold pin will extend through the central opening of the lower washer. From reference to Figures 3 and 4, it will further be seen that as the spring member 21 assumes its normal position in the slot 15, the wall of the magazine acting against the free or unsecured part of the longitudinal arm of the finger 27, applies a counteracting force to the inward pressure of the member 21 thereby pressing the lower end portion of said arm outwardly against the face of the member 21 and deflecting the inwardly extending horizontal arm of said finger downwardly, thus applying a positive pressure upon the lowermost washer so that it is properly seated upon the supporting shoulder of the mold pin P.

As seen in Figure 4, the upper end of the mold pin also projects through the opening in the washer plate disposed above the finger 27 and prevents any possibility of lateral shifting of this washer plate. The operating cycle has now been completed, the magazine returning to its normal position, during which a reversal of the above described operating movements of the spring members 20 and 21 takes place. Thus it will be seen that at the start of the upward movement of the magazine the washer plates above the lowermost washer are lifted by the finger 27, while the lowermost washer remains in its applied position upon the mold pin. Simultaneous with this initial upward movement of the magazine, the horizontal arm 22 of member 20 moves inwardly, while the spring finger 27 is moved outwardly by the coaction of the lugs 24 and 29 with the respective cams 26 and 30, whereby the washer stack is transferred from said finger 27 and the supporting element therefore to the arm 22. The members 20 and 21 arrive at the relative position seen in Figure 2 at approximately the same time so that when the washer stack is released by the spring finger 21, the edge of the lowermost washer at one side is positioned beyond the shoulder 23. Therefore, in the final return movement of the magazine, as the lug 24 thereof rides upon the cam 25, the arm 22 is slightly withdrawn to properly position the shoulder 23 beyond the edge of the lowermost washer, as seen in Figure 1.

From the above description it will be seen that I have provided a comparatively simple device which will be positive and reliable in its operation for accurately applying or positioning such conical washer plates upon the heel mold pins. The construction described also insures the release of only a single washer in each operation from the lower end of the magazine notwithstanding the fact that the washers are closely stacked or nested upon each other and there is no intervening space between the edges thereof. By the provision of a magazine apparatus of this kind, wherein the washers are superimposed upon each other and lie in parallel horizontal planes, the magazines have a maximum capacity so that the necessity for replenishing the same with washers arises only at infrequent intervals.

In Figures 8 to 12 inclusive of the drawings, I have illustrated another embodiment of the invention particularly designed for use in connection with flat washer plates wherein the washers contained in the magazine at all times remain in parallel contacting relation upon each other. In this construction the sleeve 8 is relatively short and the tubular magazine extends a considerable distance below said sleeve. At its lower end the wall of the magazine is provided in one side thereof with the horizontal slot or opening 31 which is provided in its upper edge and at each end thereof with a recess 32. In the opposite side of the magazine wall an opening 33 is formed and is disposed in substantially the same horizontal plane as the recesses 32.

The sleeve 8 has slots 15' in opposite sides thereof and the upper ends of spring members 20' and 21' are located in the respective slots and fixed to the wall of the magazine. At the lower end of the sleeve 8 the horizontal lugs 34 and 35 respectively, extend across the slots 15, the lug 34 being of somewhat greater width than the lug 35. The spring member 20' has an outward bend or projection 36 formed therein for co-operation with the lug 34 and the other spring member 21' has a similar projection 37 for co-operation with the lug 35, said projections 36 and 37 being located at approximately the same point in the length of the respective spring members. The lower end of the member 20' is formed with a horizontal arm 22' extending inwardly through the slot 31 in the magazine wall upon which the stack of washers W is normally supported. The other member 21' is also provided with a horizontal extension 38 projecting through the slot 33 in the magazine wall and disposed above the plane of the arm 22' for a distance slightly greater than the thickness of one of the washers. To the spring member 21' above the horizontal arm or extension 38 thereof, the intermediate portion of a U-shaped yoke 39 is securely fixed, said yoke being horizontally disposed and embracing the magazine 7. The parallel arms of the yoke contact with the flattened longitudinally extending guide surfaces 40 formed on the magazine wall. The extremities of this yoke 39 are turned inwardly towards each other and to the same the upper ends of the members 41 are fixed. The lower ends of these members 41 are angularly disposed in a horizontal plane substantially coinciding with the extension 38 on the spring member 21', as shown at 42 and are movable through the recesses 32 at the upper edge of the opening 31 in the magazine wall.

The operation of this embodiment of my invention will be readily understood from a comparison of Figs. 8 and 12 of the drawings. The plate 5 is supported in such relative position to the mold plate that normally the lower ends of the washer applying units are spaced above the mold pins for the proper distance so that at the limit of the downward stroke of the tubular magazine the tip end of the mold pin will be disposed substantially in the opening of only the lowermost washer. As shown in Figure 8, in the initial downward movement of the washer carrying magazine, the lug 35 is first disengaged from the projection 37 on the spring member 21' and since in this construction the members 20' and 21' have a normal tendency to spring outwardly from the slots 15', it will be clear that in this initial movement of the magazine, the yoke 39 is horizontally shifted, thereby causing the horizontal portion 42 of members 41 to force the washer W next above the lowermost washer in the stack laterally so that it will extend into and through the slot 33 in the magazine wall. In the continued downward movement of the magazine, the projection 36 on the member 20' moves below the lug 34 so that the lower end of this member 20' moves outwardly with respect to the magazine wall and as the arm 22' thereon is withdrawn through the slot 31, the lowermost washer of the stack is released so that it drops by gravity and is received upon the upper reduced end of the mold pin. This relative position of the parts which occurs at the limit of the downward movement of the magazine is illustrated in Figure 12 of the drawings, from which it will be noted that the remaining washers of the stack are sustained in their horizontal position and supported against angular tilting movement by that portion of the offset washer which extends inwardly from the slot 33 and by the horizontal portions 42 of the member 41. When the magazine is moved upwardly and returns to its normal position, the projection 36 on member 20' is first engaged with the lug 34 and the horizontal arm 22' therefore returns to its normal position beneath the washer stack. In the continued upward movement of the magazine the projection 37 engages lug 35, thereby moving yoke 39 laterally so that the horizontal extension 38 on the lower end of member 21' engaging the edge of the offset washer returns this washer which is now the lowermost washer of the stack to its former position in concentric relation to the magazine where it is received upon the supporting arm 22' of the member 20'. It will, therefore, be apparent that in this case also, only a single washer is discharged in each operation from the lower end of the magazine.

Figure 13:
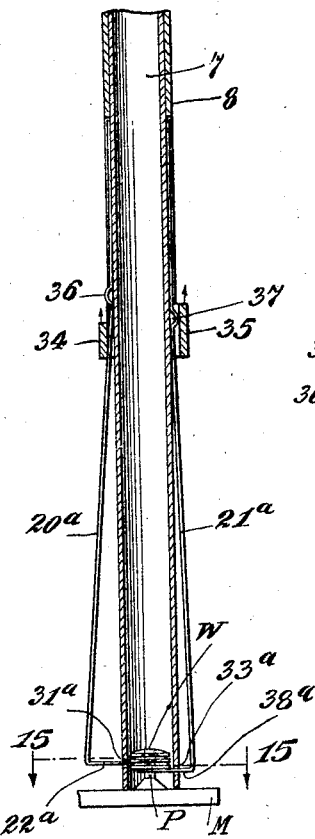
Figures 13 and 14 are fragmentary vertical sectional views showing another alternative form of my invention adapted for use in connection with another and different form of washer.
Figure 14:
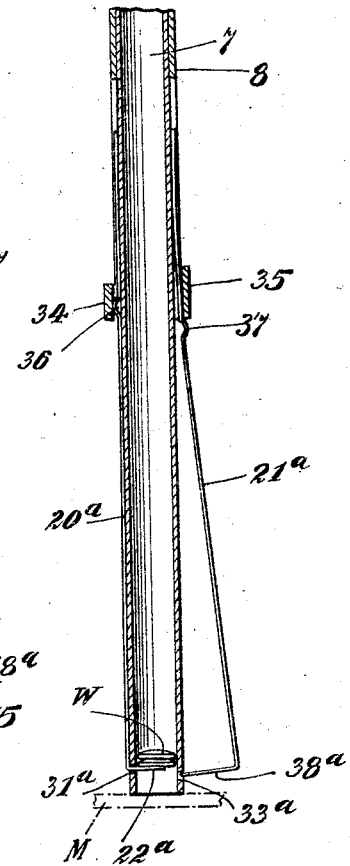
Figure 15:
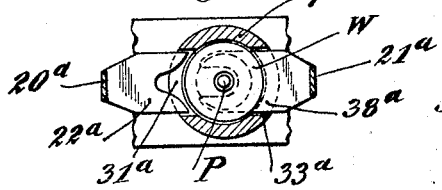
Figure 15 is a horizontal section taken on the line 15—15 of Figure 13.

In Figures 13 to 15 of the drawings I illustrate another alternative construction which may be advantageously employed when washers of the concavo-convex type are employed. Such washers differ from the conical type washer in that the former has no flat annular marginal flange. Referring to this alternative construction, the spring members 20ª and 21ª correspond to the members 20' and 21' previously referred to and are arranged in a similar manner upon opposite sides of the magazine to be actuated by the lugs 34 and 35 on the lower end of the fixed sleeve. In this embodiment of the device the plate 6 above referred to may be fixed and the plate 5 carrying the several sleeves 8 move with respect thereto. Thus instead of moving the washer magazine through the sleeve, it will be understood that in this instance, the sleeve is shifted upon the magazine, reversing the operation heretofore described. Therefore, as shown in Figure 13, the lower end of the tubular magazine seats upon the face of the mold around the washer receiving pin.

In this case, the yoke 39 above described, is omitted and the lower end of the spring member 20ª is provided with the angular horizontal extension 22ª movable through the slot 31ª in one side of the magazine wall. The other member 21ª has a horizontal supporting arm 38ª movable through the slot 33ª in the opposite side of the magazine wall. It is understood, of course, that as in the other constructions, the arms 22ª and 38ª are slotted to accommodate the mold pin.

As shown in Figure 13, normally, the washers in the magazine are supported upon the arm 38ª but it will be observed that owing to the concavo-convex form of these washers, they are slightly spaced apart at their outer edges. Thus the extension 22ª on the other spring member 20ª may enter between these spaced edges of the washers. With the parts in the normal position shown in Figure 13, when the sleeve 8 moves upwardly upon the magazine the spring member 20ª having the horizontal extension 22ª is first forced inwardly through the opening 31ª so that said extension will enter between the lowermost washer and the next adjacent washer. In the continued movement of the sleeve 8, the other spring member 21ª is released so that the arm 38ª moves outwardly, thus releasing the lowermost washer supported thereby so that it is placed in proper position upon the upper end of the pin P. The magazine is then lifted from its position upon the mold plate, the pile of washers in said magazine being sustained or supported by the extension 22ª on the member 20ª. The sleeve 8 is then moved downwardly upon the wall of the magazine so that the arm 38ª on the member 21ª is first returned to its normal position beneath the stack of washers, after which the member 20ª is released so that the arm 22ª thereof moves outwardly through the slot in the magazine wall and returns to its normal position. Therefore, in this instance where the concavo-convex washers are employed, it will be seen that the device is of exceedingly simple construction and at the same time provides means for quickly and accurately placing the washers upon the mold pins.

From the foregoing description considered in connection with the accompanying drawings, the construction, manner of operation, and several advantages of my invention will be clearly and fully understood. It will be apparent that by means of such an apparatus, the misplacing or accidental dropping of the washers on the mold plate or in the mold cavities where they may become imbedded in the surface of the molded heel, is obviated, and the operation of supplying the pins with the washers is greatly expedited. While I have described my present improvements as particularly intended for the placing of washers upon the pins of mold cavities used in the manufacture of rubber heels, it will also be apparent that such an apparatus might likewise be advantageously employed for various analogous purposes. Furthermore, it is not essential that the washers shall be of circular form, but they might be of many other different shapes in accordance with the particular use to which they are to be applied. Also, such a means as I have described for effecting the single discharge of articles from the magazine might manifestly be used for the accurate positioning of blanks either with or without the central perforation, or any other articles of a like nature which it is desired to automatically discharge singly from a magazine.

I have found the device as herein described very satisfactory in practical operation, but it will nevertheless be apparent that the same results might be obtained in other alternative mechanical structures and I accordingly reserve the privilege of resorting to all such legitimate changes in the form, construction and relative arrangement of the several parts as may be fairly embodied within the spirit and scope of the invention as claimed.

I claim:

1. In an apparatus for placing washers upon heel mold pins, a washer magazine bodily movable towards and from the mold pin and provided with diametrically opposed openings in its wall, and means for singly delivering the washers through the lower end of the magazine as the latter is moved towards the mold pin, said means consisting of members movable through the respective openings into and out of supporting relation with the washers contained in the magazine, and relatively stationary cam means for actuating said members.

2. In a washer placing apparatus for placing washers upon heel mold pins, a washer magazine yieldingly supported for bodily movement towards and from the heel mold pin, and means for singly delivering the washers from the lower end of the magazine including relatively movable members for supporting the washer stack in the magazine and separating the lowermost washer from the superposed washers, and relatively stationary cam means actuating said members in timed relation to each other in the movement of the magazine towards the mold pin.

3. In a washer placing apparatus for placing washers upon heel mold pins, a washer magazine yieldingly supported for bodily movement towards and from the heel mold pin, and means for singly delivering the washers from the lower end of the magazine including relatively movable members for supporting the washer stack in the magazine and separating the lowermost washer from the superposed washers, and means tending to yieldingly urge said members to normal positions out of supporting relation with the washers.

4. In a washer placing apparatus for placing washers upon heel mold pins, a washer magazine yieldingly supported for movement towards and from the mold pin, said magazine having diametrically opposed openings in its wall, longitudinally extending leaf springs fixed at one of their ends to opposite sides of the magazine and each having means at its other end movable through one of the openings in the magazine wall, said springs normally tending to move said means out of supporting relation with the washers, and relatively stationary cam means coacting with said springs to actuate said members in timed relation to each other and effect the discharge of the lowermost washer from the magazine.

5. In a washer placing apparatus, a magazine for supporting a plurality of closely stacked superposed washers for movement toward and from a washer receiving pin, said magazine having oppositely arranged slots, members movable through said slots in different planes for supporting the washers, and cam means automatically actuating said members, whereby the lower member is moved outwardly to release the lowermost washer and the upper member moved inwardly to support the stack of superposed washers.

6. Means for singly delivering articles of frustro-conical form from a stack of such articles closely nested upon each other, said means comprising means for shifting the lowermost article to a lateral offset position relative to the stack to thereby separate said article at its edge from the next adjacent article in the stack, and additional means movable between the spaced edges of said articles to sustain the remaining articles in the stack during the succeeding operation of said first named means whereby delivery of said lowermost article is effected.

7. Means for singly delivering articles of frustro-conical form from a stack of such articles closely nested upon each other, said means comprising means for shifting the lowermost article to a lateral offset position relative to the stack to thereby separate said article at its edge from the next adjacent article in the stack, and additional means movable between the spaced edges of said articles to sustain the remaining articles in the stack, and said means having a part engaging the offset article to return the latter to its former position whereby, in the subsequent operation of said first named means, delivery of the lowermost article is effected.

8. In a washer placing apparatus, a washer magazine, means for singly delivering washers from said magazine, said means including members diametrically movable through the magazine beneath the washer stack, one of said members having a part engaging the lower-most washer to shift the same to a lateral offset position, the other of said members being movable between said lowermost washer and the remaining washers of the stack to sustain the latter and having a part to engage said offset washer and return the same to its former position, and means for actuating said members in timed relation to each other to effect delivery of the latter washer.

9. In a washer placing apparatus, a washer magazine, means for singly delivering washers from said magazine including a member diametrically movable through the magazine from one side thereof and normally supporting the washer stack, said member having a part adapted to engage the edge of the lower-most washer and shift the same to a lateral off-set position, a second member diametrically movable through the magazine from the opposite side thereof and having a part to engage said lower-most washer and return the same to its former position, said member sustaining the remaining washers in the stack whereby only the lowermost washer is delivered, and means for actuating said members in timed relation to each other.

10. In a washer placing apparatus, a washer magazine adapted to receive a stack of frustro-conical washers in closely nested superposed relation, a movable member mounted upon one side of the magazine normally supporting the washer stack and diametrically movable with relation thereto, said member having a part to engage the lowermost washer and shift the same to a lateral offset position whereby the edge of said washer is separated from the edge of the next adjacent washer, a second member on the opposite side of the magazine diametrically movable between said lowermost washer and the next adjacent washer and having a part to return said offset washer to its former position, said member sustaining the remaining washers in the stack upon movement of said first-named washer to effect delivery of said lower-most washer, and means for actuating said members in timed relation to each other.

11. In a washer placing apparatus, a washer magazine adapted to receive a stack of frustro-conical washers in closely nested superposed relation, a movable member mounted upon one side of the magazine normally supporting the washer stack and diametrically movable with relation thereto, said member having a part to engage the lowermost washer and shift the same to a lateral offset position whereby the edge of said washer is separated from the edge of the next adjacent washer, a second member on the opposite side of the magazine diametrically movable between said lowermost washer and the next adjacent washer and having a part to return said offset washer to its former position, said member sustaining the remaining washers in the stack upon movement of said first-named washer to effect delivery of said lower-most washer, means for imparting bodily movement to the washer magazine and the washer delivering means relatively stationary cam elements, and a part on each of said members respectively coacting with certain of the cam elements to actuate said members in timed relation to each other and during the bodily movement of said magazine.

12. The method of placing washers upon the washer supporting pins of a heel mold, which consists in positioning a stack of closely nested frustro-conical washers upon a movable stack support above the heel mold pin, then moving the stack support to shift the lowermost washer in the stack to a lateral offset position whereby the edge of said lowermost washer is separated from the edge of the next adjacent superposed washer, then inserting a sustaining member for the washers above the lowermost washer between the spaced edges of the lowermost washer and the next adjacent washer and simultaneously returning said offset lowermost washer to its former position and then withdrawing the washer stack support to release said lowermost washer whereby the latter is deposited in position upon the mold pin.

In testimony that I claim the foregoing as my invention, I have signed my name hereto.

JOHN W. AYMAR, Jr.